US010769653B2

(12) United States Patent
Puehse et al.

(10) Patent No.: US 10,769,653 B2
(45) Date of Patent: Sep. 8, 2020

(54) METHOD, APPARATUS AND SERVER FOR GAMIFICATION OF ACTIVITY TRACKING TO DETERMINE A REWARD

(71) Applicant: MASTERCARD ASIA/PACIFIC PTE LTD, Singapore (SG)

(72) Inventors: Tobias Puehse, Singapore (SG); Sin Jian Tan, Singapore (SG); Jie Zhang, Singapore (SG); Douglas Teck Yong Tan, Singapore (SG); Noor Ali Nizar Ali, Singapore (SG); Naman Aggarwal, Singapore (SG); Yong Wei Chin, Singapore (SG)

(73) Assignee: MASTERCARD INTERNATIONAL INCORPORATION, Purchase, NY (US)

( * ) Notice: Subject to any disclaimer, the term of this patent is extended or adjusted under 35 U.S.C. 154(b) by 610 days.

(21) Appl. No.: 15/294,079

(22) Filed: Oct. 14, 2016

(65) Prior Publication Data

US 2017/0116634 A1    Apr. 27, 2017

(30) Foreign Application Priority Data

Oct. 23, 2015  (SG) .......................... 10201508784W (51) Int. Cl.
*G06Q 30/00* (2012.01)
*G06Q 30/02* (2012.01)
(Continued)

(52) U.S. Cl.
CPC ....... *G06Q 30/0209* (2013.01); *G06Q 20/027* (2013.01); *G06Q 20/3223* (2013.01);
(Continued)

(58) Field of Classification Search
CPC ............. G06Q 30/0209; G06Q 20/405; G06Q 20/027; G06Q 20/3223; G07F 17/3262;
(Continued)

(56) References Cited

U.S. PATENT DOCUMENTS 8,109,858 B2  2/2012  Redmann
9,280,640 B2  3/2016  Nusbaum et al.
(Continued)

OTHER PUBLICATIONS

"Steptacular: An incentive mechanism for promoting wellness". (Year: 2012).*
(Continued)

*Primary Examiner* — Maria V Vanderhorst
(74) *Attorney, Agent, or Firm* — Armstrong Teasdale LLP (57) ABSTRACT

A data processor implemented method for gamification of activity tracking to determine a reward is provided. The method includes obtaining activity tracking information from one or more activity tracking sensors, and comparing one or more associated activity tracking target with the obtained activity tracking information to generate an activity tracking level. The method also includes assessing the activity tracking level for determination of the reward, and interfacing with a payment gateway to make payment to an entity associated with the reward, wherein an amount of the payment is dependent on the reward.

22 Claims, 6 Drawing Sheets

(51) Int. Cl.
*G06Q 20/32* (2012.01)
*G07F 17/32* (2006.01)
*G06Q 20/40* (2012.01)
*G06Q 20/02* (2012.01)
*G05B 19/418* (2006.01)

(52) U.S. Cl.
CPC ....... *G06Q 20/405* (2013.01); *G07F 17/3206* (2013.01); *G07F 17/3225* (2013.01); *G07F 17/3244* (2013.01); *G07F 17/3255* (2013.01); *G07F 17/3262* (2013.01)

(58) Field of Classification Search
CPC ............. G07F 17/3255; G07F 17/3206; G07F 17/3244
See application file for complete search history.

(56) References Cited

U.S. PATENT DOCUMENTS

| | | | |
|---|---|---|---|
| 9,460,632 B2 | 10/2016 | Watterson et al. | |
| 2002/0116266 A1* | 8/2002 | Marshall | G06Q 10/10 705/14.14 |
| 2006/0111944 A1 | 5/2006 | Sirmans, Jr. et al. | |
| 2006/0293041 A1 | 12/2006 | Kim | |
| 2008/0147502 A1 | 6/2008 | Baker | |
| 2009/0144639 A1 | 6/2009 | Nims et al. | |
| 2009/0150178 A1* | 6/2009 | Sutton | A61B 5/222 705/2 |
| 2010/0125028 A1 | 5/2010 | Heppert | |
| 2012/0253485 A1 | 10/2012 | Weast et al. | |
| 2013/0106684 A1 | 5/2013 | Weast et al. | |
| 2013/0196298 A1 | 8/2013 | Watterson et al. | |
| 2013/0332286 A1* | 12/2013 | Medelius | A61B 5/01 705/14.66 |
| 2014/0067494 A1 | 3/2014 | Squires | |
| 2014/0163430 A1 | 6/2014 | Tropper et al. | |
| 2014/0176475 A1 | 6/2014 | Myers et al. | |
| 2014/0255889 A1* | 9/2014 | Grimes | G06Q 50/20 434/236 |
| 2014/0297393 A1 | 10/2014 | Phillipps | |
| 2015/0006274 A1 | 1/2015 | Calbucci et al. | |
| 2015/0042475 A1* | 2/2015 | White | G16H 20/30 340/573.1 |
| 2015/0262212 A1 | 9/2015 | Schrock et al. | |
| 2016/0078781 A1 | 3/2016 | McCartney | |

OTHER PUBLICATIONS

International Search Report and Written Opinion, Application No. PCT/SG2016/050514, dated Dec. 23, 2016, 12 pps.

* cited by examiner

METHOD, APPARATUS AND SERVER FOR GAMIFICATION OF ACTIVITY TRACKING TO DETERMINE A REWARD

CROSS REFERENCE TO RELATED APPLICATIONS

This application claims the benefit of Singapore Patent Application No. 10201508784W filed Oct. 23, 2015, which is hereby incorporated by reference in its entirety.

BACKGROUND

The present disclosure relates to a method, apparatus and server for gamification of activity tracking to determine a reward.

Currently, an increasing number of individuals are becoming more health-conscious, and they use apps on their mobile phones and/or wearable activity-tracking devices to keep track of the activities/exercises which they have participated in. Typically, a record of the activities/exercises which they have participated in is stored on the individuals' mobile phone/remote storage account. At the moment, the stored records belonging to the individuals are not processed for purposes pertaining to the individuals' financial benefit.

In addition, the increasing number of health-conscious individuals are a highly coveted demographic which insurance companies would like to reach out to, as their healthy lifestyles typically lead to more healthy individuals which may lead to a lower incidence of medical claims. Current practices by the insurance companies to attract the health-conscious demographic include partnering third party merchants to offer special promotions at the third party merchants, but such practices have questionable effectiveness as the third party merchants may not be appealing to the health-conscious demographic. It is noted that other organisations other than insurance companies are also keen to engage with the health-conscious demographic.

Thus, it is desirable if organisations could leverage off the habits of the health-conscious demographic, for example, the regular use of wearable activity-tracking devices, and be able to engage the health-conscious demographic in an effective manner.

BRIEF DESCRIPTION

In a first aspect of the disclosure, a data processor implemented method for gamification of activity tracking to determine a reward is provided. The method including obtaining activity tracking information from at least one activity tracking sensor, comparing at least one associated activity tracking target with the obtained activity tracking information to generate an activity tracking level, assessing the activity tracking level for determination of the reward, and interfacing with a payment gateway to make payment to an entity associated with the reward. It is preferable that an amount of the payment is dependent on the reward. The reward can be non-monetary.

The method can further include transmitting information on a desired payment mode to the payment gateway.

Preferably, assessing the activity tracking level is carried out at a server, and the information on a desired payment mode is transmitted via the server. Secured data processing can be carried out at the server.

Preferably, the activity tracking information is selected from, for example, number of footsteps, number of climbing steps, distance ran, distance swam, distance cycled, and so forth.

It is preferable that the activity tracking level is a ratio of the activity tracking information to the at least one associated activity tracking target or is a relative measure of the activity tracking information to the at least one associated activity tracking target.

Preferably, the at least one associated activity tracking target includes a first associated activity tracking target, and that the assessing of the activity tracking level is further for determination of a second associated activity tracking target. Alternatively, the at least one associated activity tracking target includes a first associated activity tracking target, and that the first associated activity tracking target is reset after a pre-determined period of time.

In a second aspect of the disclosure, a non-transitory computer readable storage medium having a program of computer readable instructions embodied thereon. When executed by one or more processors of a user's mobile device in communication with a server, the program of computer readable instructions cause the device to perform a method for gamification of activity tracking to determine a reward for the user, the method including the steps of obtaining activity tracking information of the user from at least one activity tracking sensor, comparing at least one associated activity tracking target with the obtained activity tracking information to generate an activity tracking level, and interfacing with a payment gateway to make payment to an entity associated with the reward. It is preferable that an amount of the payment is dependent on the reward. The reward can be non-monetary.

The storage medium can preferably further include transmitting information on a desired payment mode to the payment gateway, assessing the activity tracking level for determination of the reward, transmitting to a server the activity tracking level for assessing the activity tracking level, and receiving from the server an assessment of the activity tracking level for determination of the reward.

Preferably, the information on a desired payment mode is transmitted via the server, and secured data processing is carried out at the server.

It is preferable that the activity tracking information is selected from, for example, number of footsteps, number of climbing steps, distance ran, distance swam, distance cycled, and the like.

Preferably, the activity tracking level is a ratio of the activity tracking information to the at least one associated activity tracking target. Alternatively, the activity tracking level is a relative measure of the activity tracking information to the at least one associated activity tracking target.

It is preferable that the at least one associated activity tracking target includes a first associated activity tracking target, and that the assessing of the activity tracking level is further for determination of a second associated activity tracking target. Alternatively, the at least one associated activity tracking target includes a first associated activity tracking target, and the first associated activity tracking target is reset after a pre-determined period of time.

In a third aspect of the disclosure, an apparatus for gamification of activity tracking to determine a reward is provided. The apparatus using the method mentioned in the preceding paragraphs, whereby the apparatus includes a display configured to provide a graphical user interface. Preferably, an amount of payment is dependent on the reward.

In a fourth aspect of the disclosure, a non-transitory computer readable storage medium having a program of computer readable instructions embodied thereon. When executed by one or more processors of a mobile device in communication with a server, the program of computer readable instructions cause the server to perform a method for gamification of activity tracking to determine a reward for the user, the method including receiving from the mobile device an activity tracking level for assessing the activity tracking level, and transmitting to the mobile device an assessment of the activity tracking level for determination of the reward. It is preferable that an amount of payment is dependent on the reward. The reward can be non-monetary.

Preferably, the activity tracking level is a ratio of an activity tracking information to at least one associated activity tracking target. Alternatively, the activity tracking level is a relative measure of an activity tracking information to at least one associated activity tracking target.

In a fifth aspect of the disclosure, a system for gamification of activity tracking to determine a reward for the user is provided. The system including a mobile device configured for obtaining activity tracking information for a user, and at least one server configured for assessing an activity tracking level. It is preferable that the assessment of the activity tracking level enables determination of the reward, wherein an amount of payment is dependent on the reward. The reward can be non-monetary.

It is preferable that the activity tracking level is a ratio of the activity tracking information to at least one associated activity tracking target. Alternatively, the activity tracking level is a relative measure of the activity tracking information to at least one associated activity tracking target.

It is preferable that the mobile device includes at least one activity tracking sensor.

BRIEF DESCRIPTION OF THE DRAWINGS

In order that the present disclosure may be fully understood and readily put into practical effect, there shall now be described, by way of non-limitative example only certain embodiments of the present disclosure, the description being with reference to the accompanying illustrative figures, in which.

DETAILED DESCRIPTION

Figure 1:
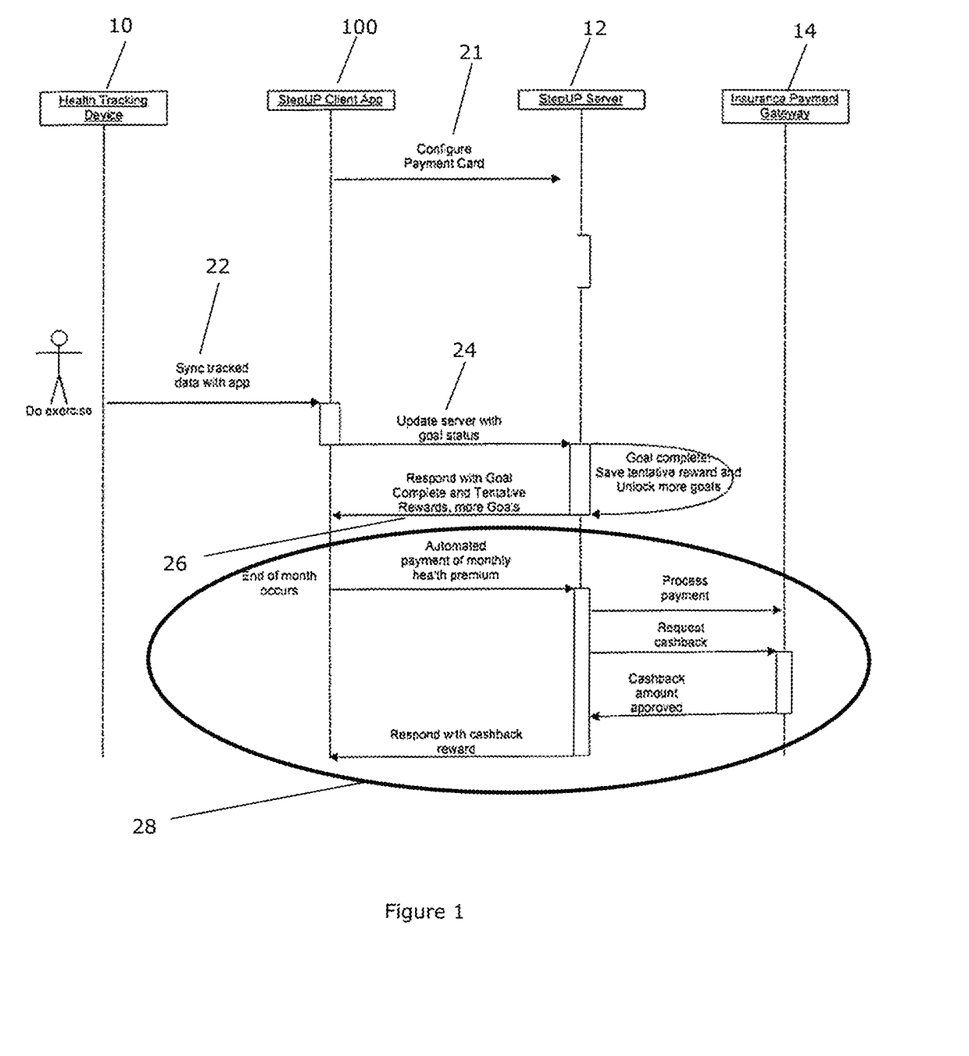
FIG. 1 shows a schematic overview of a method of embodiments of the present disclosure.

Embodiments of the present disclosure are initially described with reference to FIGS. 1 to 3. Certain embodiments provide a data processor implemented method for gamification of activity tracking to determine a reward. The reward can be provided by an entity who is keen to leverage on the gamification of activity tracking. It should be appreciated that the reward can be non-monetary, such as, for example, redemption coupons, physical objects, loyalty points, and so forth. The method allows quantification of a user's activities and subsequent use of the quantification findings for desired purposes. The user's activities can include, for example, walking, swimming, cycling, jogging, step climbing, and so forth.

Figure 2:
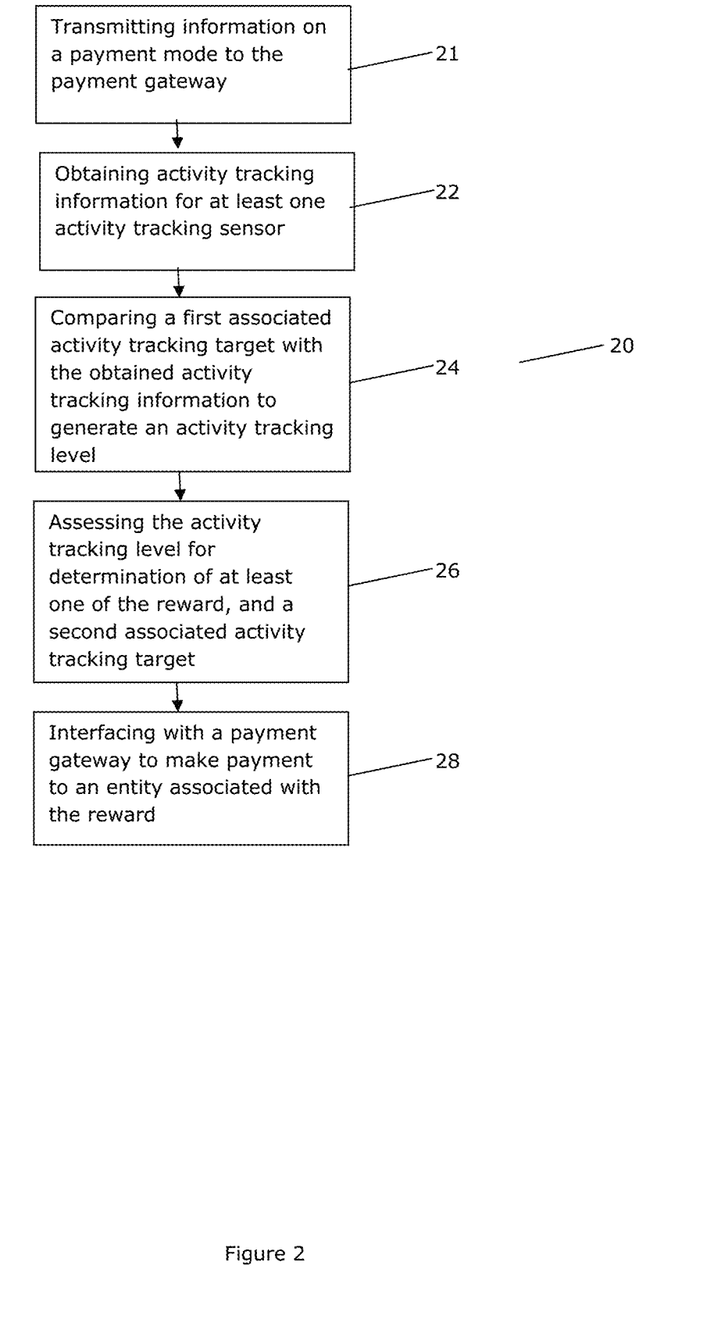
FIG. 2 shows a process flow of a data processor implemented method of embodiments of the present disclosure.
Figure 3A:
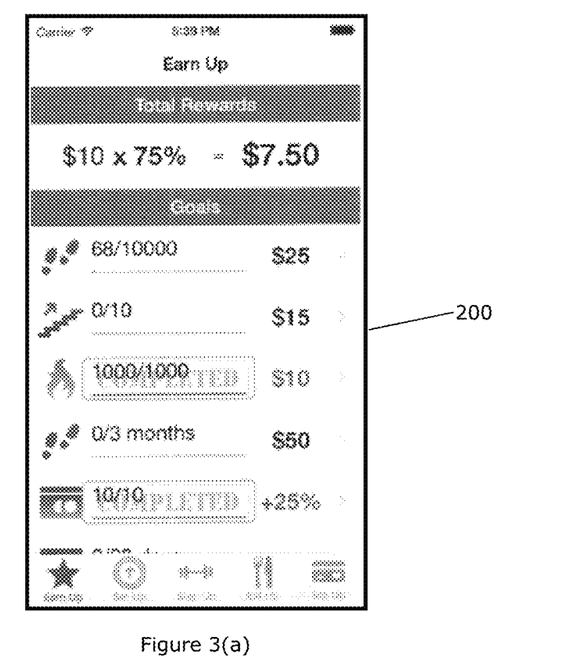
FIGS. 3(a) to 3(c) show graphical user interfaces generated in the method shown in FIG. 2.
Figure 3B:
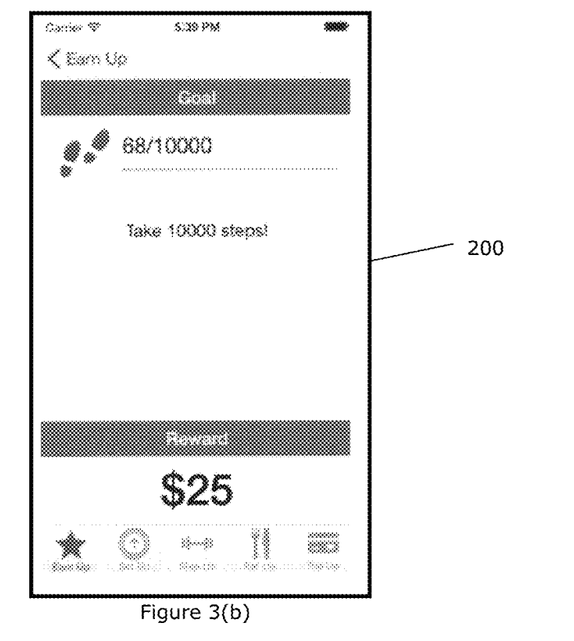
Figure 3C:
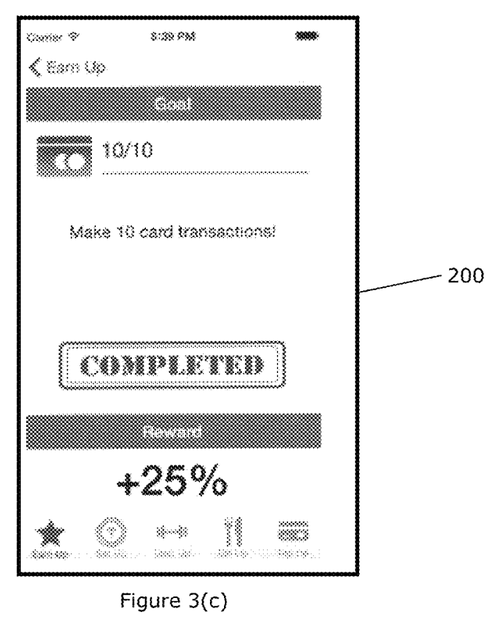

FIG. 2 shows the steps of an exemplary method. FIG. 1 shows a context in which the steps are carried out. While FIG. 3 shows screen shots of a graphical user interface which may appear during certain steps of the method.

Each of the blocks of the flow diagram of FIG. 2 may be executed by one or more data processors or one or more portion of the data processors (for example, a single core of a multi-core processor). The processes may be embodied in a non-transient machine-readable and/or computer-readable medium for configuring a computer system to execute the method. one or more software modules may be stored within and/or transmitted to a computer system memory to configure the computer system to carry out the tasks indicated in each of the blocks of the flow diagram.

Figure 4:
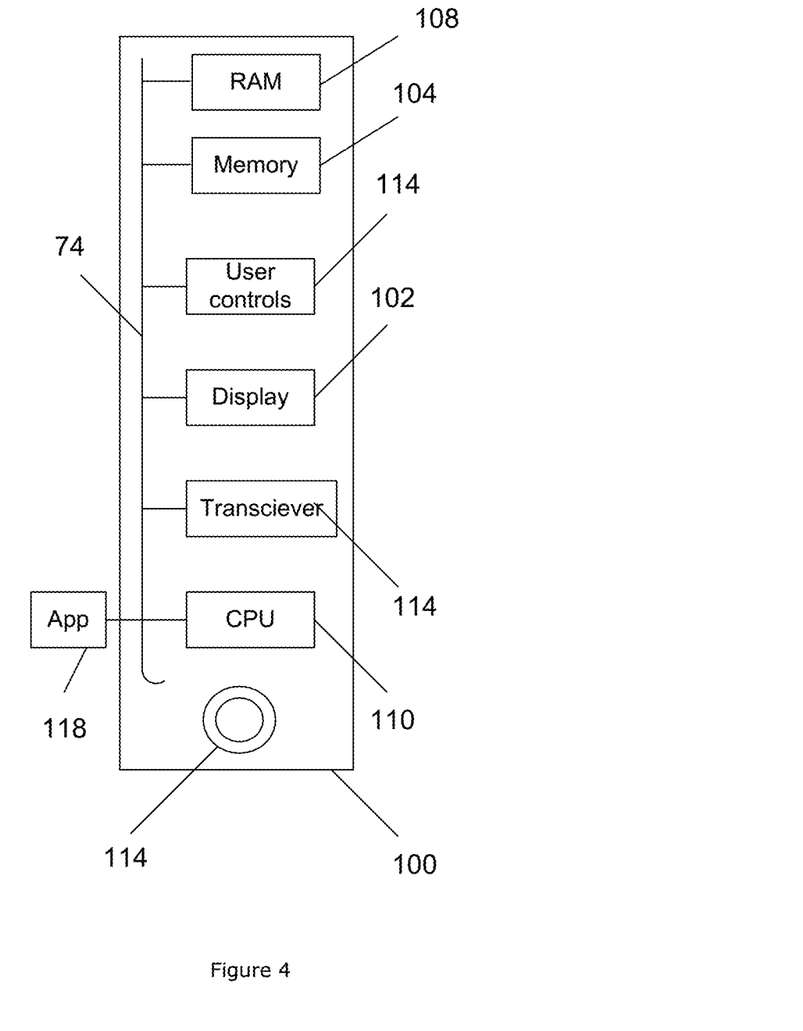
FIG. 4 shows a schematic view of a user device used in the method shown in FIG. 2.

The method 20 can be carried out on a mobile device 100. The mobile device 100 is a handheld computer device such as a smart phone or a tablet computer, such as one manufactured by Apple™, LG™, HTC™, Samsung™, and Motorola™. An exemplary embodiment of the mobile device 100 is shown in FIG. 4. As shown, the device 100 includes the following components in electronic communication via a bus 106:

a display 102;
non-volatile memory 104;
random access memory ("RAM") 108;
N processing components 110;
a transceiver component 112 that includes N transceivers; and
user controls 114.

Although the components depicted in FIG. 4 represent physical components, FIG. 4 is not intended to be a hardware diagram. Thus, many of the components depicted in FIG. 4 may be realized by common constructs or distributed among additional physical components. Moreover, it is certainly contemplated that other existing and yet-to-be developed physical components and architectures may be utilized to implement the functional components described with reference to FIG. 4.

The display 102 generally operates to provide a presentation of content to a user, and may be realized by any of a variety of displays (e.g., CRT, LCD, HDMI, micro-projector, and OLED displays). And in general, the non-volatile memory 104 functions to store (e.g. persistently store) data and executable code including code that is associated with the functional components of the method. In some embodiments, for example, the non-volatile memory 104 includes bootloader code, modem software, operating system code, file system code, and code to facilitate the implementation of one or more portions of the method as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Figure 5:
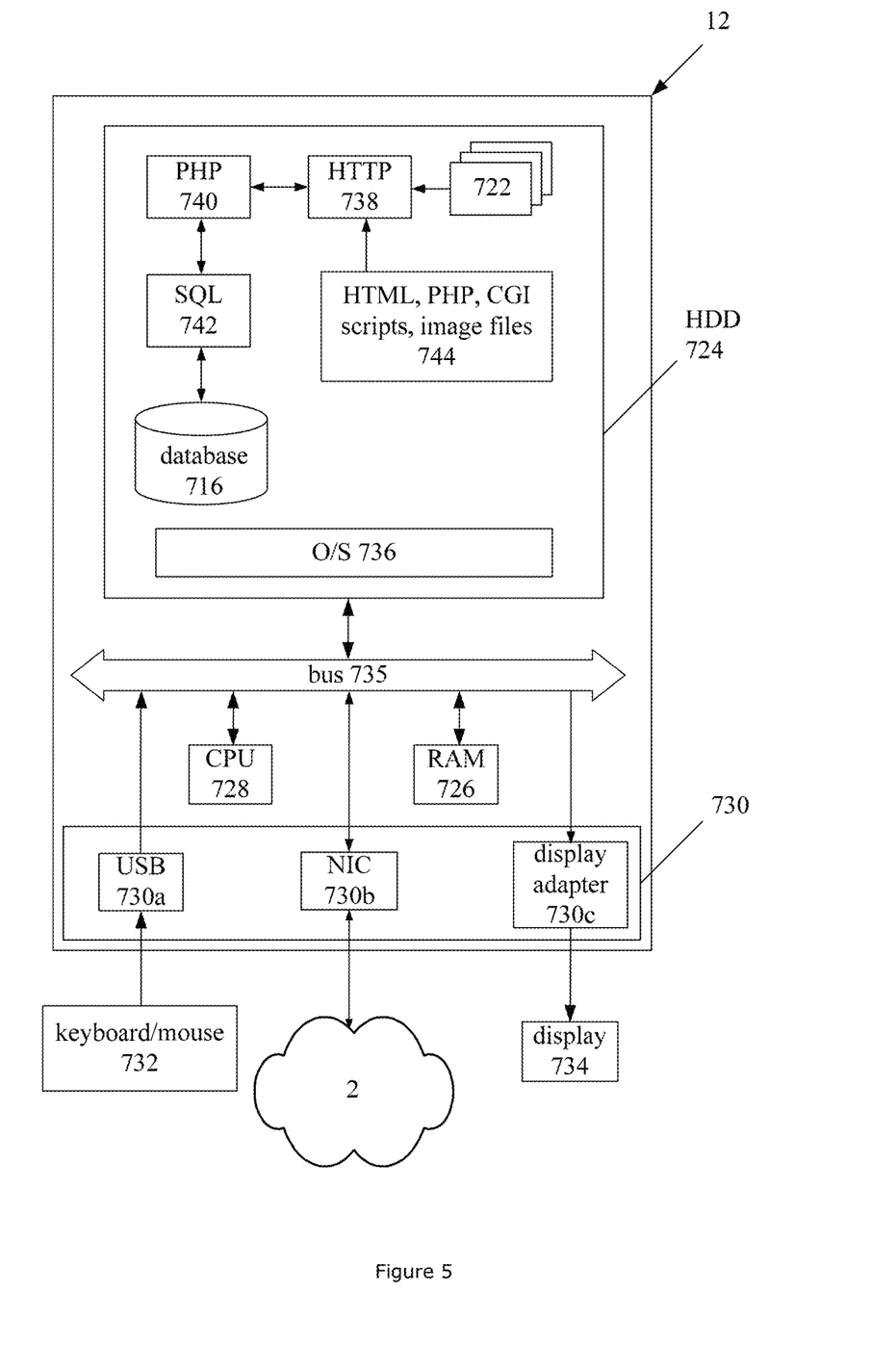
FIG. 5 shows a schematic view of a server used in the method shown in FIG. 2.

Some steps of the method 20 can be carried out by a server 12 as shown in FIG. 5. The server 12 is able to communicate with the mobile device 100 over a communications network 2 using standard communication protocols.

It should be appreciated that the method 20 can be configured to be performed in a variety of ways. The steps can be implemented entirely by software to be executed on standard computer server hardware, which may include one hardware unit or different computer hardware units distributed over various locations, some of which may require the communications network 2 for communication. A number of the components or parts thereof may also be implemented by application specific integrated circuits (ASICs) or field programmable gate arrays.

In FIG. 5, the server 12 is a commercially available server computer system based on a 32 bit or a 64 bit Intel architecture, and the processes and/or methods executed or performed by the computer server 12 are implemented in the form of programming instructions of one or more software components or modules 722 stored on non-volatile (e.g., hard disk) computer-readable storage 724 associated with the server 12. At least parts of the software modules 722 could alternatively be implemented as one or more dedicated hardware components, such as application-specific integrated circuits (ASICs) and/or field programmable gate arrays (FPGAs).

The server 12 includes at least one or more of the following standard, commercially available, computer components, all interconnected by a bus 735:

1. random access memory (RAM) 726;
2. at least one computer processor 728, and
3. external computer interfaces 730:
   a. universal serial bus (USB) interfaces 730a, at least one of which is connected to one or more user-interface devices, such as a keyboard, a pointing device (e.g., a mouse 732 or touchpad);
   b. a network interface connector (NIC) 730b which connects the server 12 to a data communications network, such as the Internet 2; and
   c. a display adapter 730c, which is connected to a display device 734 such as a liquid-crystal display (LCD) panel device.

The server 12 includes a plurality of standard software modules, including:

1. an operating system (OS) 736 (e.g., Linux or Microsoft Windows);
2. web server software 738 (e.g., Apache, available at http://www.apache.org);
3. scripting language modules 740 (e.g., personal home page or PHP, available at http://www.php.net, or Microsoft ASP); and
4. structured query language (SQL) modules 742 (e.g., My SQL, available from http://www.mysql.com), which allow data to be stored in and retrieved/accessed from an SQL database 716.

Together, the web server 738, scripting language 740, and SQL modules 742 provide the server 12 with the general ability to allow users of the Internet 2 with mobile device 100 equipped with standard web browser software to access the server 12 and in particular to provide data to and receive data from the database 716. It will be understood by those skilled in the art that the specific functionality provided by the server 12 to such users is provided by scripts accessible by the web server 738, including the one or more software modules 722 implementing the processes performed by the server 12, and also any other scripts and supporting data 744, including markup language (e.g., HTML, XML) scripts, PHP (or ASP), and/or CGI scripts, image files, style sheets, and the like.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the disclosure. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the server 12 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The server 12 normally processes information according to a program (a list of internally stored instructions, such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Referring back to FIG. 2, the method 20 includes obtaining activity tracking information from at least one activity tracking sensor (22). The activity tracking information includes at least one of, for example, number of footsteps, number of climbing steps, distance ran, distance swam, distance cycled and so forth. It should be appreciated that the at least one activity sensor can be configured to track a single activity or a plurality of activities.

The at least one activity sensor can be an accelerometer or a gyroscope, for example. Each of the at least one activity sensors can be found within a wearable activity tracking device 10 or in the mobile device 100. If the at least one activity sensor is within the wearable activity tracking device 10, the information from the at least one activity sensor can be obtained either via a wireless data transmission channel or a data cable.

The method 20 also includes comparing a first associated activity tracking target with the obtained activity tracking information to generate an activity tracking level (24). The activity tracking level can be a ratio of the activity tracking information to the associated activity tracking target, or another relative measure such as a difference or a relative difference (e.g., the difference scaled by the associated tracking target).

This comparison step, tracking level (24), can be carried out on the mobile device 100 or at a server 12. For example, in FIG. 3(*a*), the graphic user interface 200 which is displayed on the display 102 shows that the first associated activity tracking target for walking is "10000", while the obtained activity tracking information is "68" and the activity tracking level is "68/10000". Further examples include the first associated activity tracking target for climbing stairs is "10", while the obtained activity tracking information is "0" and the associated activity tracking level is "0/10." First associated activity tracking target for burning calories is "1000", while the obtained activity tracking information is "1000" and the associated activity tracking level is "1000/1000" and so forth.

The method 20 also includes assessing the activity tracking level for determination of at least one of the reward, and a second associated activity tracking target (26) for the user. The assessment of the activity tracking level is carried out at a server 12, the data processing carried out at the server 12 being secured. Secured data processing at the server is preferable to minimise risk of tampering/hacking. The second associated activity tracking target is typically provided once the first associated activity tracking target is met by the user (e.g., FIG. 3(*c*)), and is either a reset of the first associated activity tracking target after it has undergone prior increases or an increase of a level of the activity tracking target. The second associated activity tracking target which increases the level of the activity tracking target typically leads to a more desirable reward for the user if the user is able to reach the second associated activity tracking target. It should be appreciated that the first associated activity tracking target can be reset after a pre-determined period of time, such as, for example, one month, one quarter of a calendar year, one calendar year, and so forth. The pre-determined period can be determined by a frequency that the user makes periodic payment to an entity associated with the reward.

Subsequently, the method 20 then includes interfacing with a payment gateway 14 to make payment to the entity associated with the reward (28), whereby the payment amount is dependent on the reward. Even though FIG. 1 shows interfacing between the mobile device 100 and the payment gateway 14 via the server 12, it should be appreciated that processing by the server 12 is not mandatory as the payment gateway 14 is able to cope with the processing load. However, interfacing with the payment gateway 14 via the server 12 is preferable to minimise risk of tampering/hacking. Furthermore, the reward can be a percentage discount for the payment, or a quantifiable offset for the payment. In addition, during instances when the reward is non-monetary, the payment is made with a request for the non-monetary reward, for example, for a redemption letter for a physical object. It should be appreciated that the payment gateway 14 can be managed by a third party which is not associated with the entity associated with the reward.

The method 20 also further includes transmitting information on a desired payment mode to the payment gateway 14 (21). Even though FIG. 1 shows interfacing between the mobile device 100 and the payment gateway 14 via the server 12, it should be appreciated that processing by the server 12 is not mandatory as the payment gateway 14 is able to cope with the processing load. However, interfacing with the payment gateway 14 via the server 12 is preferable to minimise risk of tampering/hacking. The desired payment mode can be using, for example, credit cards, debit cards, electronic payment processes, and so forth.

The method 20 is able to provide the user with rewards (financial and non-financial) for maintaining a healthy lifestyle. In addition, the method 20 also ensures that the entities which are associated with the rewards are able to incentivise their customers to maintain a healthy lifestyle, which will likely lead to better health for their customers and possible benefits for the entities associated with the rewards. For example, insurers may have lower incidence of health-related claims if their customers are healthy. Furthermore, the incentives for the users can also aid in fostering loyalty and goodwill towards the respective entities associated with the rewards.

In another aspect, a standalone device is provided. The standalone device does not need to interface with the mobile device 100, and is able to carry out the method 20. Such a device can be a smartwatch which allows installation of a program (app) which is configured to carry out the method 20. The smartwatch can be a device manufactured by, for example, Apple™, LG™, Garmin™, Samsung™, and Motorola™.

The smartwatch should be capable of displaying a graphic user interface which facilitates the gamification experience for the user. Thus, the standalone device is also able to provide the user with rewards (financial and non-financial) for maintaining a healthy lifestyle. In addition, the standalone device also ensures that the entities which are associated with the rewards are able to incentivise their customers to maintain a healthy lifestyle, which will likely lead to better health for their customers and possible benefits for the entities associated with the rewards. For example, insurers may have lower incidence of health-related claims if their customers are healthy. Furthermore, the incentives for the users can also aid in fostering loyalty and goodwill towards the respective entities associated with the rewards.

Whilst there have been described in the foregoing description preferred embodiments of the present disclosure, it will be understood by those skilled in the art concerned that many variations or modifications in details of design or construction may be made without departing from the present disclosure.

What is claimed is:

1. A computer-implemented method for gamification of activity tracking to determine a reward for a user, the method implemented by a gamification computing system including at least one mobile device and at least one server, the method comprising:

obtaining, by the at least one mobile device, activity tracking information of the user from at least one activity tracking sensor of the at least one mobile device, wherein the activity tracking information includes a measurement of a first type of physical activity of a plurality of types of physical activity performed by the user, wherein each type of physical activity is associated with a corresponding one of a plurality of activity tracking targets and a corresponding one of a plurality of activity tracking levels, each activity tracking target including a predetermined value set for each corresponding type of physical activity based on each corresponding type of physical activity, each activity tracking level associated with each activity tracking target corresponding to each type of physical activity;

comparing, by the at least one mobile device, the predetermined value of a first activity tracking target corresponding to the first type of physical activity with the obtained measurement;

updating, by the at least one mobile device based on results of the comparison, a first activity tracking level associated with the first activity tracking target corresponding to the first type of physical activity;

transmitting, by the at least one mobile device to the at least one server, each activity tracking level for each corresponding type of physical activity, including the first type of physical activity, each activity tracking level assessed by the at least one server for electronic determination of each reward associated with each corresponding type of physical activity;

interfacing, by the at least one mobile device via the at least one server, with a payment gateway to make payment to an entity associated with a first reward corresponding to the first type of physical activity based on the updated first activity tracking level associated with the first activity tracking target, wherein an amount of the payment is dependent on the first reward; and displaying, on a graphic user interface of the at least one mobile device, a plurality of rows of data, each of the plurality of rows of data corresponding to one of the plurality of types of physical activity, wherein each row of data identifies the corresponding type of physical activity and an activity tracking level for the corresponding type of physical activity.

2. The method of claim 1, further comprising transmitting information on a desired payment mode to the payment gateway.

3. The method of claim 1, wherein the information on a desired payment mode is transmitted via the at least one server.

4. The method of claim 1, wherein secured data processing is carried out at the at least one server.

5. The method of claim 1, wherein the activity tracking information is selected from a group consisting of: number of footsteps, number of climbing steps, distance ran, distance swam, and distance cycled.

6. The method of claim 1, wherein each activity tracking level is a relative measure of the activity tracking information to the corresponding activity tracking target.

7. The method of claim 1, wherein the reward is non-monetary.

8. The method of claim 1, further comprising transmitting to the at least one server one of the plurality of activity tracking levels for assessing the one of the plurality of activity tracking levels for determination of a second activity tracking target.

9. The method of claim 1, wherein the first activity tracking target is reset after a pre-determined period of time.

10. A non-transitory computer readable storage medium having a program of computer readable instructions, wherein when executed by one or more processors of a user's mobile device in communication with a server, the program of computer readable instructions cause the one or more processors to:

obtain activity tracking information of the user from at least one activity tracking sensor of the user's mobile device, wherein the activity tracking information includes a measurement of a first type of physical activity of a plurality of types of physical activity performed by the user, wherein each type of physical activity is associated with a corresponding one of a plurality of activity tracking targets and a corresponding one of a plurality of activity tracking levels, each activity tracking target including a predetermined value set for each corresponding type of physical activity based on each corresponding type of physical activity, each activity tracking level associated with each activity tracking target corresponding to each type of physical activity;

compare the predetermined value of a first activity tracking target corresponding to the first type of physical activity with the obtained measurement;

update, based on results of the comparison, a first activity tracking level associated with the first activity tracking target corresponding to the first type of physical activity;

transmit to the server each activity tracking level for each corresponding type of physical activity, including the first type of physical activity, each activity tracking level assessed by the server for electronic determination of each reward associated with each corresponding type of physical activity;

interface, via the server, with a payment gateway to make payment to an entity associated with a first reward corresponding to the first type of physical activity based on the updated first activity tracking level associated with the first activity tracking target, wherein an amount of the payment is dependent on the first reward; and display, on a graphic user interface of the user's mobile device, a plurality of rows of data, each of the plurality of rows of data corresponding to one of the plurality of types of physical activity, wherein each row of data identifies the corresponding type of physical activity and an activity tracking level for the corresponding type of physical activity.

11. A system for gamification of activity tracking to determine a reward for a user, the system including:

a mobile device configured to:

obtain activity tracking information of the user, wherein the activity tracking information includes a measurement of a first type of physical activity of a plurality of types of physical activity performed by the user, wherein each type of physical activity is associated with a corresponding one of a plurality of activity tracking targets and a corresponding one of a plurality of activity tracking levels, each activity tracking target including a predetermined value set for each corresponding type of physical activity based on each corresponding type of physical activity, each activity tracking level associated with each activity tracking target corresponding to each type of physical activity;

compare the predetermined value of a first of the plurality of activity tracking targets corresponding to the first type of physical activity with the obtained measurement; and update, based on results of the comparison, a first activity tracking level associated with the first activity tracking target corresponding to the first type of physical activity; and at least one server configured to:

assess each activity tracking level for each corresponding type of physical activity, including the first type of physical activity for electronic determination of each reward associated with each corresponding type of physical activity;

interface with a payment gateway to make payment to an entity associated with a first reward corresponding to the first type of physical activity based on the updated first activity tracking level associated with the first activity tracking target, wherein an amount of payment is dependent on the first reward; and cause to be displayed, on a graphic user interface of the mobile device, a plurality of rows of data, each of the plurality of rows of data corresponding to one of the plurality of types of physical activity, wherein each row of data identifies the corresponding type of physical activity and an activity level for the corresponding type of physical activity.

12. The system of claim 11, wherein the at least one server is further configured to cause to be displayed, on the graphic user interface of the mobile device, on each of the plurality of rows of data, the reward for the corresponding type of physical activity.

13. A non-transitory computer readable storage medium embodying thereon a program of computer readable instructions, wherein when executed by one or more processors of a server in communication with at least one mobile device, cause the server to perform a method for gamification of activity tracking to determine a reward for a user, including the steps of:

receiving from the at least one mobile device, a first of a plurality of activity tracking levels of the user, the first activity tracking level associated with a first type of physical activity of a plurality of types of physical activity and a first activity tracking target of a plurality of activity targets, the first type of physical activity performed by the user, and the first activity tracking target corresponding the first type of physical activity, wherein the first activity tracking level is updated by comparing the first activity tracking target corresponding to the first type of physical activity with a measurement included in activity tracking information obtained from at least one activity tracking sensor of the at least one mobile device;

assessing the first activity tracking level for the corresponding first type of physical activity for electronic determination of a first reward associated with the corresponding first type of physical activity;

interfacing with a payment gateway to make payment to an entity associated with the first reward corresponding to the first type of physical activity based on the updated first activity tracking level associated with the first activity tracking target, wherein an amount of the payment is dependent on the first reward; and causing to be displayed, on a graphic user interface of the mobile device, a plurality of rows of data, each of the plurality of rows of data corresponding to one of the plurality of types of physical activity, wherein each row of data identifies a corresponding type of physical activity and an activity tracking level for the corresponding type of physical activity.

14. The storage medium of claim 13, wherein the first activity tracking level is a relative measure of the activity tracking information to the corresponding first activity tracking target.

15. The storage medium of claim 13, wherein the reward is non-monetary.

16. The storage medium of claim 13, wherein the program of computer readable instructions further cause the server to cause to be displayed, on the graphic user interface of the mobile device, on each of the plurality of rows of data, the reward for the corresponding type of physical activity.

17. The system of claim 11, wherein the mobile device is further configured to display, on the graphic user interface of the mobile device, on each of the plurality of rows of data, the reward for the corresponding type of physical activity.

18. The system of claim 17, wherein each activity tracking level is a relative measure of the activity tracking information to a corresponding activity tracking target.

19. The system of claim 17, wherein the reward is non-monetary.

20. The system of claim 17, wherein the mobile device includes at least one activity tracking sensor.

21. The method of claim 1, further comprising displaying, on the graphic user interface of the at least one mobile device, on each of the plurality of rows of data, the reward for the corresponding type of physical activity.

22. The storage medium of claim 10, wherein the program of computer readable instructions further cause the one or more processors to display, on the graphic user interface of the user's mobile device, on each of the plurality of rows of data, the reward for the corresponding type of physical activity.

* * * * *